United States Patent [19]

Uhde et al.

[11] Patent Number: 5,764,457
[45] Date of Patent: Jun. 9, 1998

[54] CASSETTE INCLUDING A RECORDING MEDIUM FOR A RECORDING APPARATUS

[75] Inventors: Dietmar Uhde, Königsfeld; Jens Spille, Laatzen; Fritz Weisser, St. Georgen; Hans-Joachim Platte, Hemmingen; Jürgen Kaaden, Villingen-Schwenningen; Ernst F. Schröder; Heinz-Werner Keesen, both of Hannover; Rolf Schiering, Hemmingen, all of Germany

[73] Assignee: Deutsche Thomson-Brandt GmbH, Germany

[21] Appl. No.: 839,534

[22] Filed: Apr. 14, 1997

Related U.S. Application Data

[63] Continuation of Ser. No. 256,251, Oct. 17, 1994, filed as PCT/EP92/02994, published as WO93/14501, abandoned.

[30] Foreign Application Priority Data

| Jan. 10, 1992 | [DE] | Germany | 42 00 436.5 |
| Jan. 10, 1992 | [DE] | Germany | 42 00 435.7 |
| Feb. 13, 1992 | [DE] | Germany | 42 04 180.5 |
| Mar. 6, 1992 | [DE] | Germany | 42 07 211.5 |
| Mar. 9, 1992 | [DE] | Germany | 42 07 381.2 |
| Jul. 22, 1992 | [DE] | Germany | 42 24 116.2 |
| Jul. 23, 1992 | [DE] | Germany | 42 24 828.0 |

[51] Int. Cl.⁶ ............................................ G11B 23/087
[52] U.S. Cl. ...................................................... 360/132
[58] Field of Search .................................. 360/132, 133

[56] References Cited

U.S. PATENT DOCUMENTS

| 4,057,839 | 11/1977 | Banks | 360/93 |
| 4,995,029 | 2/1991 | Kobayashi et al. | 369/291 |

FOREIGN PATENT DOCUMENTS

| 879620 | 2/1980 | Belgium . |
| 0373718 | 6/1990 | European Pat. Off. . |
| 0440493 | 8/1991 | European Pat. Off. . |
| 3812747 | 10/1989 | Germany . |
| 58-111163 | 7/1983 | Japan . |
| 62-157391 | 7/1987 | Japan . |
| 63-031083 | 2/1988 | Japan . |
| 1-251488 | 10/1989 | Japan . |
| 2-083879 | 3/1990 | Japan . |
| 2-201789 | 8/1990 | Japan . |
| 4-184781 | 7/1992 | Japan . |
| 89/10614 | 11/1989 | WIPO . |
| 91/02355 | 2/1991 | WIPO . |

OTHER PUBLICATIONS

Patent Abstracts of Japan, vol. 11, No. 391, 12 Dec. 1987 (Sony Corp) and Japan. Pat. No. 62-157391 (see above).

Patent Abstracts of Japan, vol. 16, No. 506, 20 Oct. 1992 (Toshiba Corp.) and Japan. Pat. No. 4-184781 (see above).

*Primary Examiner*—Robert S. Tupper
*Attorney, Agent, or Firm*—Joseph S. Tripoli; Joseph J. Laks; Francis A. Davenport

[57] ABSTRACT

A cassette for use with a recording apparatus comprises: a housing for a recording medium, the housing having a first surface and side walls, the recording medium being accessible through one of the side walls; at least a part of a chip card affixed to the housing, forming a second surface of the housing and closing the cassette, the chip card part having a memory formed integrally therewith and externally accessible contacts; and, the contacts of the chip card being positioned on the second surface to be engageable by corresponding contacts in the recording apparatus when the cassette is inserted therein. One of the side walls has an access door for the recording medium and the second surface forms an upper wall of the housing as defined by the access door. The part of the chip card forming the second surface of the housing has a marking position at which light transmissivity can be controlled. The marking position can be rendered non transmissive to light to prevent recording.

5 Claims, 7 Drawing Sheets

OTHER PUBLICATIONS

Patent Abstracts of Japan, vol. 13, No. 590, 26 Dec. 1989 (Fujitsu General Ltd.) and Japan. Pat. No. 1–251488 (see above).

Patent Abstracts of Japan, vol. 14, No. 494, 26 Oct. 1990 (NEC Home Electron Ltd.) & Japan. Pat. No. 2–201789 (see above).

Patent Abstracts of Japan, vol. 14, No. 282, 19 Jun. 1990 (Hidefumi Tomioka) * Japan. Pat. No. 2–083879 (see above).

Patent Abstracts of Japan, vol. 12, No. 240, 8 Jul. 1988 (NEC Corp.) & Japan. Pat. No. 63–031083 (see above).

Patent Abstracts of Japan, vol. 7, No. 216, 24 Sep. 1983 (Matsushita Denki Sangyo KK) & Japan. Pat. No. 58–111163 (see above).

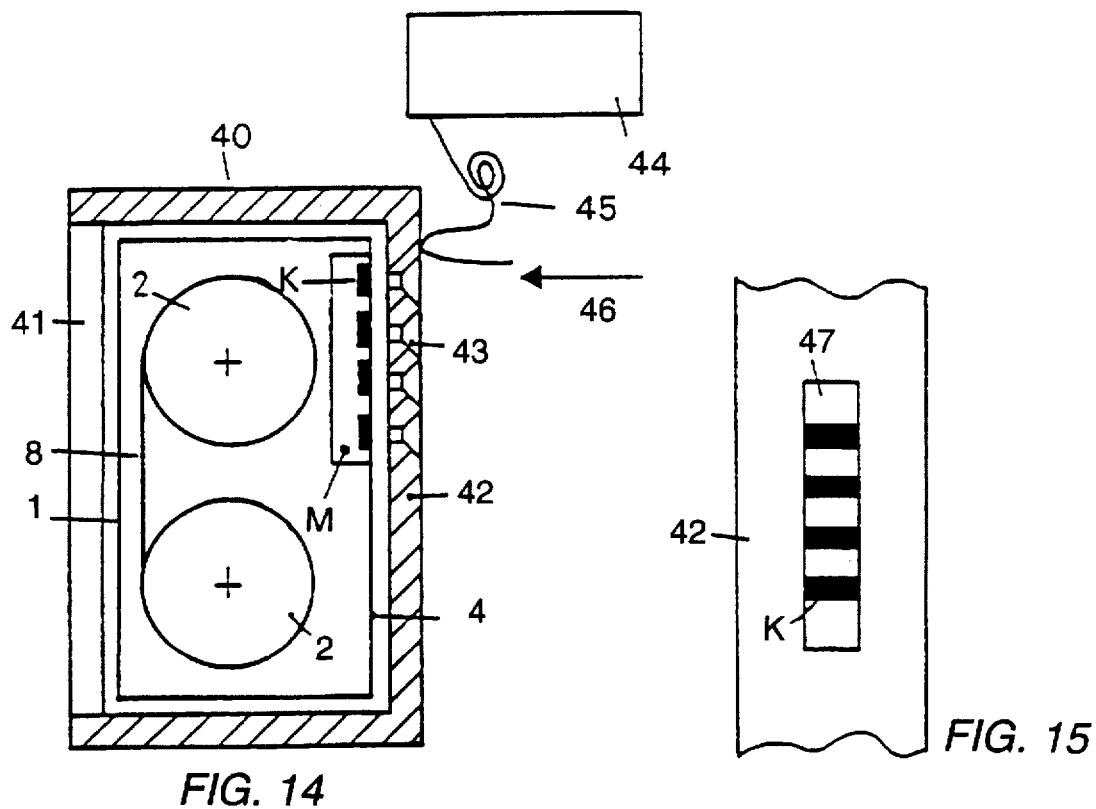
FIG. 14
FIG. 15
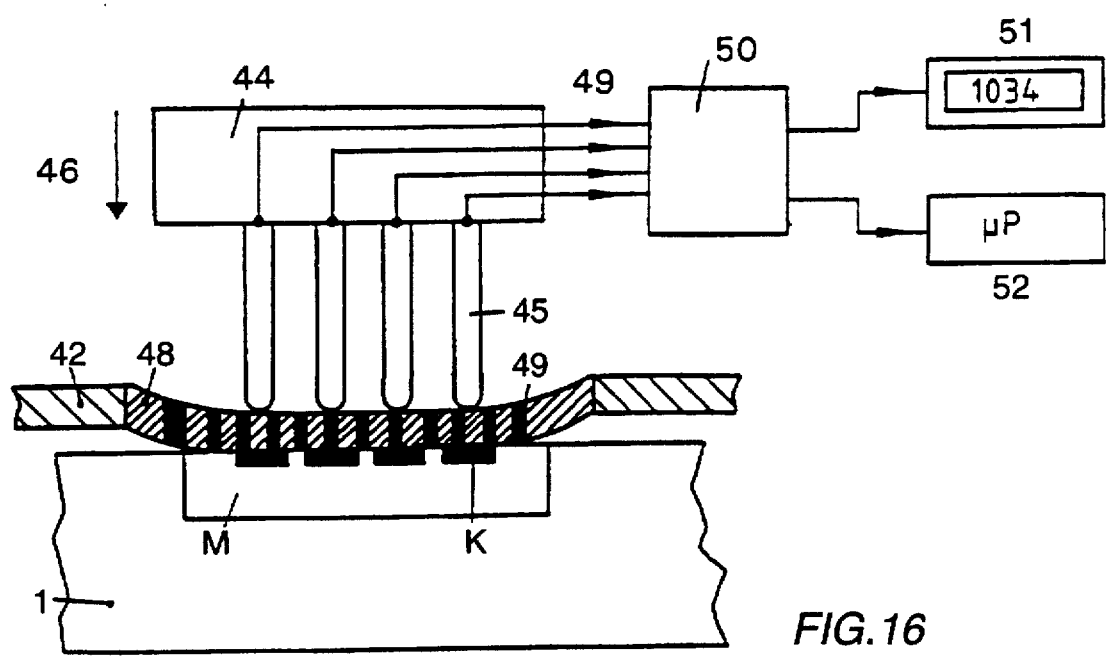
FIG. 16

CASSETTE INCLUDING A RECORDING MEDIUM FOR A RECORDING APPARATUS

This is a continuation of application Ser. No. 08/256,251, filed Oct. 17, 1994 abn.

The invention relates to the field of cassettes for recording media, and in particular, to such cassettes provided with electronic storage media for cassette information and recorded program information.

A cassette with an electronic recording medium is known from DE-PS 29 43 409. Amongst other things, an electronic storage component of this type, in a cassette, serves for storing characteristic values which are typical of the cassette and which control certain electrical or mechanical functions of the apparatus during the recording or reproduction process. Characteristic values of this type may, for example, relate to the length of the recording medium, the type of magnetic layer, the type of recorded signals, to pre-emphasis of the signals and the like. The store [or memory] may also contain items of data regarding the recorded items i.e. a contents list. Contacts on the cassette housing, which are connected to the memory, are contacted by a spring contact set located in the apparatus, which spring contact set reads out the signals from the memory and supplies them to an evaluating circuit. The memory and the contacts have to be additionally mounted on the cassette housing.

The object of the invention is to achieve a simple and cheap manner of production of a cassette including a memory of this type and to avoid expensive assembly methods for mounting the memory and contacts. This object is achieved by the invention defined in claim 1. Advantageous developments of the invention are specified in the appendant claims.

With the invention, an object, which is already in common use in another field and which is manufactured by the million as a mass produced article and which is correspondingly cheap, is utilised for a new purpose. Preferably a chip card is utilised, such as is nowadays known for telephone cards, cheque cards or other such cards as incorporate stored credits. Thereby, a known and proven manufacturing technique can be exploited for realising the cassette including a memory in accordance with the invention. The cover in accordance with the invention also makes it possible, without any great expense, to realise the transparent viewing window for assessing the state of the tape which is usual in cassettes. Preferably, a transparent marking position which co-operates with a light barrier in the apparatus and forms a means for barring a recording, is additionally built into the cover. Then, recording can only be effected, when the marking position is transparent and the light from the light source reaches the photo-cell of the light barrier. By covering-over or blacking out the intrinsically transparent marking position, the bar on recording can be activated in the sense of a protection against erasure.

The contacts are preferably located at the upper, front edge of the cassette at which the access to the recording medium occurs by insertion of a scanning head or by threading-out the tape. This location of the contacts has the advantage that the accessible, unprotected contacts are not so easily touched and dirtied during manual insertion of the cassette. This is based on the fact that, in general, the cassette is gripped at the rear end and is inserted from the front end at which the access to the recording medium occurs. A further advantage consists in that, by arranging a spring contact set in the apparatus directly at the beginning of the reception slot for the cassette, the memory can be immediately read at the beginning of the insertion process and thus the characteristic values are rapidly available.

Preferably, the contacts are arranged on the upper side of the cassette housing i.e. on the surface which is provided for the user to write on. Amongst other things, this has the advantage that e.g. a reading device for the memory, which is independent of the recording apparatus, can be placed on the contacts from above without the cassette having to be twisted around for this purpose. Such a reading device is described in the earlier patent application P 41 35 371. Preferably, the said marking position acting as a bar on recording is also arranged on the upper side. Then, by glancing at the upper side of the cassette on which the inscription field or label is located, the user can simultaneously see with the naked eye whether the bar on recording is activated or has been lifted.

The cover in accordance with the invention can thus fulfil a multiplicity of functions. Thereby, it serves, in particular, purely as a covering for the cassette housing on the upper side, for receiving the memory and the contacts, it forms the viewing window for observing the state of the tape, serves as an inscription or advertising surface and contains the transparent marking position for blocking a recording. The cassette in accordance with the invention is suitable, in particular, as a new type of cassette for a digital video recording.

A cassette for use with a recording apparatus, in accordance with an inventive arrangement, comprises: a housing for a recording medium, the housing having a first surface and side walls, the recording medium being accessible through one of the side walls; at least a part of a chip card affixed to the housing, forming a second surface of the housing and closing the cassette, the chip card part having a memory formed integrally therewith and externally accessible contacts; and, the contacts of the chip card being positioned on the second surface to be engageable by corresponding contacts in the recording apparatus when the cassette is inserted therein.

In a presently preferred embodiment of this inventive arrangement, one of the side walls has an access door for the recording medium and the second surface forms an upper wall of the housing as defined by the access door. The part of the chip card forming the second surface of the housing has a marking position at which light transmissivity can be controlled. The marking position can be rendered non transmissive to light to prevent recording.

A cassette for use with a recording apparatus, in accordance with another inventive arrangement, comprises: a housing for a recording medium, the housing having upper and lower surfaces and side walls, the recording medium being accessible through one of the side walls; the housing of the cassette having a recess which is otherwise provided for receiving a sensing lever which prevents recording when the cassette is inserted in the recording apparatus and the sensing member projects into the recess; at least a part of a chip card disposed in the recess in the housing of the cassette, the chip card part having a memory formed integrally therewith and externally accessible contacts; and, the contacts of the chip card part being positioned to be engageable by corresponding contacts in the recording apparatus when the cassette is inserted therein.

In a presently preferred embodiment of this other inventive arrangement, the cassette further comprises resilient means disposed between an inwardly facing surface of the chip card part and an outwardly facing surface of the recess. The cassette can conform, for example, to a VHS cassette standard or to a digital recording cassette standard.

The invention will be explained hereinafter with the help of the drawing. Therein FIG. 1 shows a top view of a cassette in accordance with the invention, FIG. 2 the same cassette without an imprint and FIG. 3 the same cassette with an enlarged illustration of the contacts and the memory.

FIG. 4 a cassette constructed in accordance with the invention and

FIG. 5 the cassette with the opto-electronic evaluating means in the recorder

FIG. 14 shows a cassette in a protective sleeve.

FIG. 15 shows an elongated opening in the wall of a protective sleeve.

FIG. 16 shows a Zebra connector in the wall of a protective sleeve.

Figure 1:
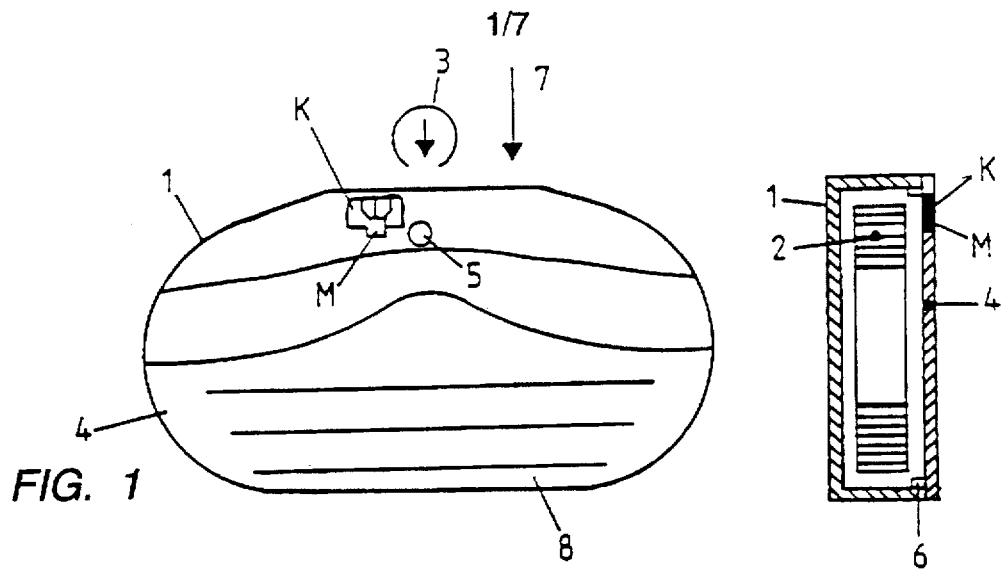

FIG. 1 shows the cassette housing 1 in which two tape spools 2 carrying the magnetic tape are rotatably mounted. The access to the recording medium occurs from the front side 7 of the cassette illustrated either by engagement of the symbolically illustrated heads 3 or by threading-out the tape and wrapping it around a head drum. When the cassette is inserted manually into the apparatus, the cassette is normally gripped by the hand in the rear region 8. The cassette housing 1 is closed on the upper side by the surface 4. The surface 4 is constructed as a chip card having an integrated semiconductor memory M and externally accessible open contacts K which are associated therewith. The cover 4 may be punched out from a conventional chip card. Upon inserting the cassette into the recording apparatus, a spring contact set arranged in the apparatus comes into contact with the contacts K whereby the characteristic values and the items of data stored in the memory M are read and supplied to an evaluating circuit in the apparatus.

The surface 4 is additionally provided with the transparent marking position 5. A light barrier which co-operates with this marking position 5 is arranged in the apparatus. The marking position 5 is normally transparent so that the light from the light source of the light barrier reaches the photo-cell. This is a criterion for permitting a recording to be made i.e. the bar on recording is then lifted. For activating the bar on recording, the transparent marking position 5 is made non-transparent or less transparent, e.g. by sticking on a foil or by blackening it with a pen. The light from the light source then no longer reaches the photo-cell, or only at very low intensity, whereby an electrical or mechanical bar on recording is activated in the apparatus. Due to the location of the contacts K of the memory M and of the marking position 5 on the front upper side of the cassette housing 1, these parts can be simultaneously observed when inserting the cassette. At the same time, the touching of these parts by hand is thereby prevented to a great extent. The spring contact set in the apparatus is preferably arranged forward of and above the cassette receiving slot, at its starting point. Thereby, the spring contact set is already in contact with the contacts K when the cassette begins to be inserted so that the characteristic values contained in the memory M are read early on in the course of the insertion and are supplied to the evaluating circuit.

Figure 2:
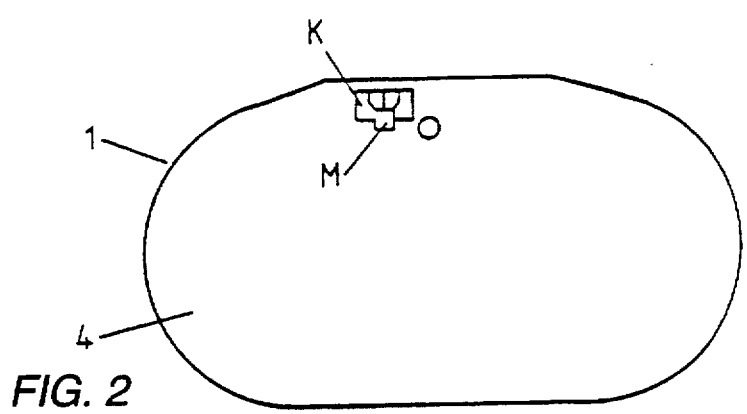

FIG. 2 merely shows the cassette housing 1 in accordance with FIG. 1 without a label imprint.

Figure 3:
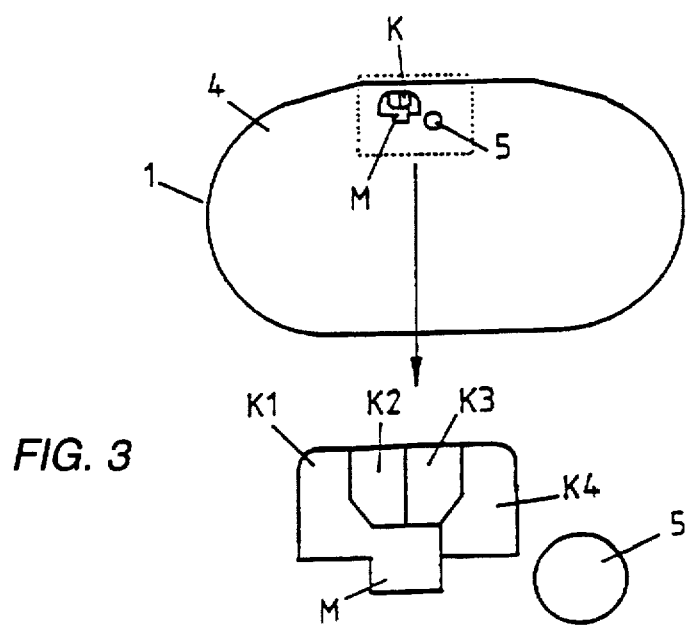

FIG. 3 again shows a cassette in accordance with FIGS. 1, 2 wherein the contacts K, the memory M and the marking position 5 are shown enlarged. There are illustrated altogether 4 contacts K1-K4 which are connected to the terminals of the memory M. The contacts K1-K4 preferably lie in a plane including the plane of the surface 4 in order to allow the spring contact set in the apparatus to be contacted satisfactorily.

The surface 4 may also be provided with a surrounding rib 6 which serves to stabilise the surface 4, as a guard and as an additional sticking surface between the surface 4 and the cassette housing 1. The means, which are usually provided in the apparatus and which press the inserted cassette downwardly onto the chassis of the apparatus, may simultaneously include the spring contact set for contacting the contacts K. The spring contact set is preferably constructed and arranged such that it also contacts the contacts K in the final, inserted state of the cassette in the apparatus.

Figure 4:
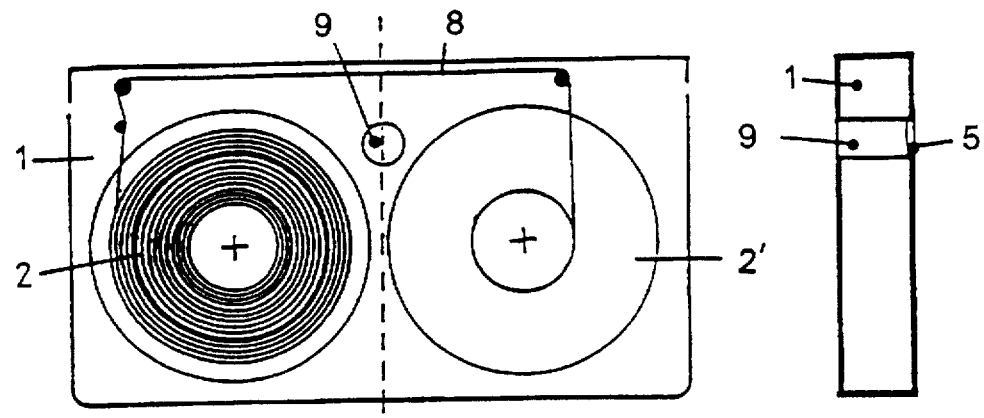

In FIG. 4, two tape spools 2, 2' on which the magnetic tape 8 is wound are rotatably mounted in the cassette housing 1. The housing 1 contains an opening (hole) 9, which forms a marking position 5 at the end. Light or a light source in the recorder is inserted through the opening 9. The marking position 5 is thus interrogated in the recorder in the manner of a light barrier. If the marking position 5 is transparent, the light beam reaches a photo-cell through the opening 9 and the marking position 5 and allows a recording to be made. If a bar on recording for the purpose of preventing erasure is wanted, then the marking position 5 is not transparent i.e. it is made non-transparent or less transparent so that the light beam of the light barrier no longer reaches the photo-cell or, only with insufficient intensity. By means of the evaluating electronics, a bar on recording is then activated, which thus acts as erasure-protection against unintentional erasure of an existing recording. The conversion of the marking position 5 from the transparent into the non-transparent state can be effected for example, by a label or, to a lesser extent, by blackening with a pen. By observing the marking position 5, the user can immediately recognise at any time with the naked eye whether the bar on recording is activated or has been lifted.

Figure 5:
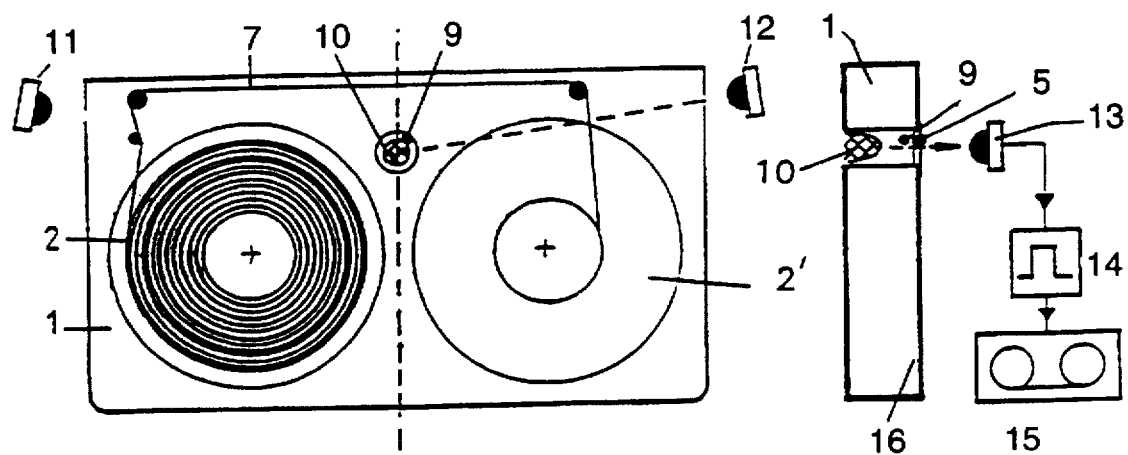

FIG. 5 shows a cassette 1 such as is used for VHS. The light source 10 arranged on the recorder chassis engages from below in the hole 9 of the housing 1. The light source 10 is effective, via holes in the cassette housing 1 which are opened in the play-back mode, on two photo-cells 11, 12 and, together with the transparent sections of the tape at the beginning and at the end of the tape, causes the apparatus to switch off whenever forward motion or rewind has ended. The hole 9, which is in any case present, is now additionally constructed, as in FIG. 1, as a marking position 5. In contrast with known cassettes, the hole 9 is not closed at the end remote from the light source 10 on the upper side of the cassette 1, but rather, has a transparent covering which can be made non-transparent or less transparent for activating the bar on recording as described in FIG. 1.

If a bar on recording is not wanted, the light beam from the light source 10 reaches the photo-cell 13, which in a VHS cassette for example is arranged above the cassette, via the transparent marking position 5. This controls the bar on recording means 14 for the recording unit 15 so that a recording is then possible. For activating the bar on recording, the marking position 5 is made non-transparent or less transparent so that either no light beam, or only residual light of low intensity, reaches the photo-cell 13. The bar on recording means 14 then acts on the recording unit 15 such that a recording is mechanically or electrically prevented. With pre-recorded cassettes which are for sale or hire and for which an accidental erasure should basically be prevented, the marking position 5 may, in general, be blocked off in that, for example, the wall 16 of the housing 1 is not interrupted at the marking position 5, but rather, is continuous. Then, a transparent marking position 5, which is the prerequisite for allowing a recording to be made, cannot, in principle, be produced by the user without causing destruction.

It is also possible to make the upper cover plate of the cassette housing 1 completely or substantially completely transparent. A partially transparent construction is in any case necessary in practice in order to form a viewing window for perceiving the state of the tape spool. The upper cover plate then forms the viewing window by means of its transparent region on the one hand and the marking position 5 on the other hand. In addition, the cover may also have a surface for sticking on a label.

In a further development of the invention, the opening provided in VHS cassettes, which basically serves for the bar on recording, is utilised in an advantageous manner for accommodating the memory on the cassette housing. A plurality of advantages thereby arise. The memory can be subsequently mounted on any of the VHS cassettes that are in use and on the market without any alteration to the cassette since every VHS cassette exhibits the said opening. Due to the utilisation of the available opening, there also results a precisely defined positioning of the memory on the cassette even when this is being installed subsequently by customers or unskilled persons. The instalment is very easy for the user. No particular care needs to be exercised when fixing the memory. In addition, the attachment of the memory to the cassette housing cannot occur in the wrong position. The functioning of a conventional VHS recorder is not adversely influenced by the modified cassette. When a memory has been installed, the sensing lever in the recorder registers the fact, just as before, that the recording can be permitted. The memory only needs to be removed from the opening for achieving a bar on recording. The sensing lever in the recorder then registers the fact that a bar on recording is wanted and prevents a recording being made.

This development is based on the perception that the opening, which is in any case present, is large enough for admitting a memory having the needed memory content. Preferably, the memory has geometrical dimensions which are such that it can be inserted into the opening with substantially no free-play so as to be flush with the surface of the cassette housing thereby closing it while still retaining its position, but such that, it can however, be extracted again.

The opening of the VHS cassette and/or the memory are preferably provided with means which ensure a secure and yet releasable attachment of the memory to the cassette housing. Means of this kind may be formed by a double sided adhesive tape, by a touch and close fastener or by means of an interlocking connector, a so-called snap-in. Just like a conventional VHS recorder, a recorder provided for the cassette constructed in accordance with the invention has a sensing lever at the location of the opening in the cassette housing. However, the sensing lever performs a double function. On the one hand, the sensing lever has contacts with which the contacts on the installed memory are contacted and which serve for writing or reading the items of data contained in the memory. Moreover, the sensing lever has a second contact which registers whether the opening is open and thus whether a bar on recording is wanted, or, whether the opening is closed and thus a recording can be allowed to be made.

Since the contacts of the memory lie in the plane of the surface of the cassette housing and the cassette is generally grasped by hand, impermissibly high voltages, which endanger the memory, can occur due to static charges on the contacts. It is well known to provide memories with protecting diodes which prevent the occurrence of dangerous voltages. For the utilisation of memories that are not protected in this way, additional means can be provided on the cassette housing which prevent the occurrence of high voltages of this kind on the contacts of the memory. One solution consists in providing a metallic frame on the cassette housing upon which the contacts of the memory rest under spring pressure. The frame then short circuits all of the contacts together so that no voltage differences can occur. When the cassette is inserted into the recorder, a sensing lever provided on the recorder is effective through an opening in the frame on the contacts, thereby produces the required contact and simultaneously pushes the memory into the cassette housing against the force of a spring until the contacts are freed from the metallic frame.

This development will be explained hereinafter with the aid of the FIGS. 6–12.

Figure 6:
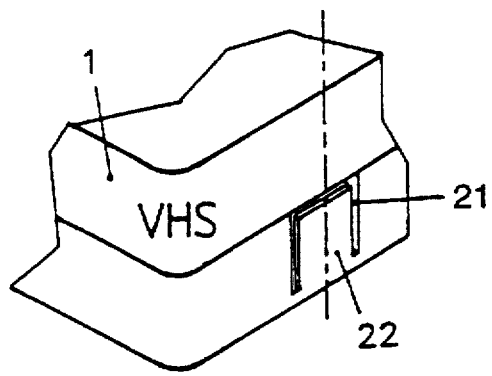
FIG. 6 shows a part of a cassette housing with an opening for blocking recording.

FIG. 6 shows a part of the cassette housing 1 of a conventional VHS cassette (unrecorded cassette) having an opening 21 which is closed by the safety tongue 22. In this form, the bar on recording is not effective, the recording can thus be made.

Figure 7:
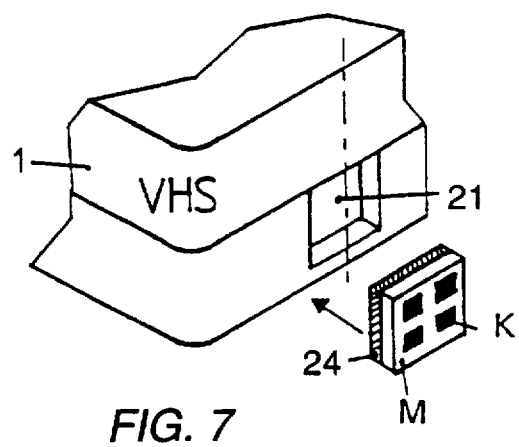
FIG. 7 shows an alternative embodiment for placing a memory in a cassette.

In FIG. 7, the safety tongue 22 in accordance with FIG. 6 has been broken off. The memory M can be installed in the opening 21 that has now been made accessible, the memory being provided with the sticky layer 24 on its rear side for this purpose. The memory M is thus held in the opening 21 such that it cannot be lost but, for activating a bar on recording, such that it can be removed when necessary. The memory M fits in the opening 21 with substantially no free play and is approximately flush with and closes the upper surface of the cassette housing 1. In a VHS recorder, the bar on recording is effective when the memory M is not installed in the opening 21. If the memory M is inserted into the opening 21, the recording is made allowable in a conventional VHS recorder as in FIG. 6.

Figure 8:
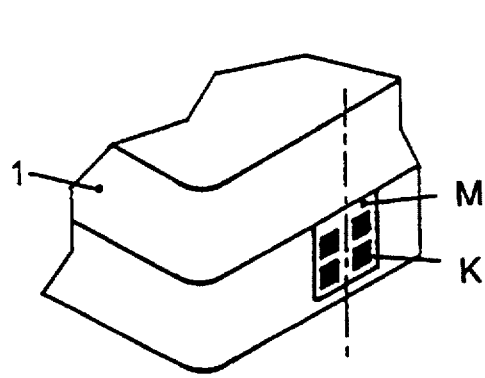
FIG. 8 shows a memory placed in an opening for blocking recording.

FIG. 8 shows the cassette housing 1 including an inserted memory M. A conventional VHS recorder not having means for contacting the contacts K would evaluate the cassette in accordance with FIG. 8 in exactly the same way as the cassette in accordance with FIG. 6 because the sensing lever detects the presence of the safety tongue 22 in accordance with FIG. 6 due to its impingement on the surface of the memory M.

Figure 9:
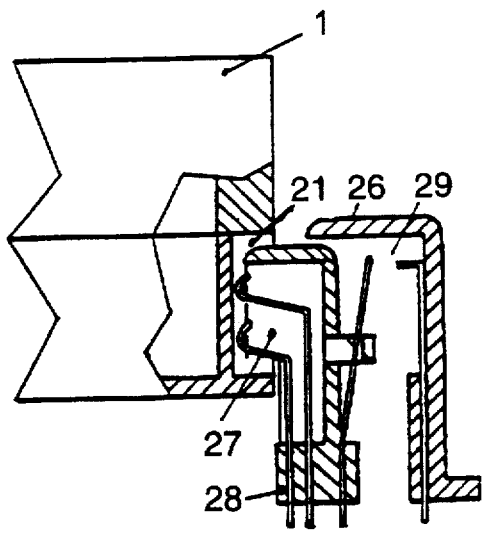
FIG. 9 shows a double sensing lever.

FIG. 9 shows the double sensing lever 26 of a recorder which is equipped for a cassette including a memory in accordance with FIG. 8. In FIG. 9, the memory M is removed from the opening 21. The contact set 27 of the lever 26, which is provided for contacting the contacts K of the memory M, then has no effect. The part 28 of the sensing lever 26 gets into the opening 21 due to spring action. A contact 29 on the lever 26 is thereby opened. The contact 29 is connected to the recording circuit such that the bar on recording is effective, i.e. a recording is prevented as is desired.

Figure 10:
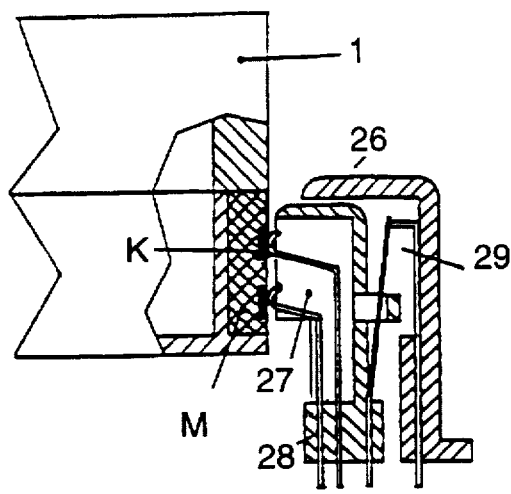
FIG. 10 shows a double sensing lever engaging a memory.

In FIG. 10, the memory M is inserted in the opening 21. The contact set 27 now contacts the contacts K of the memory M. The items of data relating to the recording medium such as for example, the length, the type of tape, the type of recording, the titles of the recordings, write-protection and the like, can thereby be written and read. Due to the fact that the part 28 cannot penetrate into the opening 21, the contacts 29 remain closed. It is assumed in FIG. 10 that the memory M is fixed in the housing 1. Consequently, it cannot be unambiguously determined from the fact that the contact 29 is closed whether a bar on recording is not desired. The recorder therefore contains an additional detection circuit which determines whether the contact set 27 of the sensing lever 26 relates to a safety tongue 22 in accordance with FIG. 6 or to the contacts K of a memory M in accordance with FIG. 10. A detection of this kind is possible for example, in that the current consumption, the flow of data or the resistive loading on the contact set 27 is measured. These values are practically zero for a safety tongue 22 in accordance with FIG. 6 while they have measurable, finite values in the presence of a memory M. If the presence of a safety tongue 22 is detected in this way, then the bar on recording is not actuated, i.e. the recording is allowed. If the presence of a memory M is detected, the information as to whether a bar on recording is wanted or not is derived from the items of data read out from the memory M. These items of data may indicate for example whether a bar on recording is wanted for the whole recording medium within the cassette housing 1 or only for certain parts of the recording medium or for certain recordings located thereon.

Figure 11:
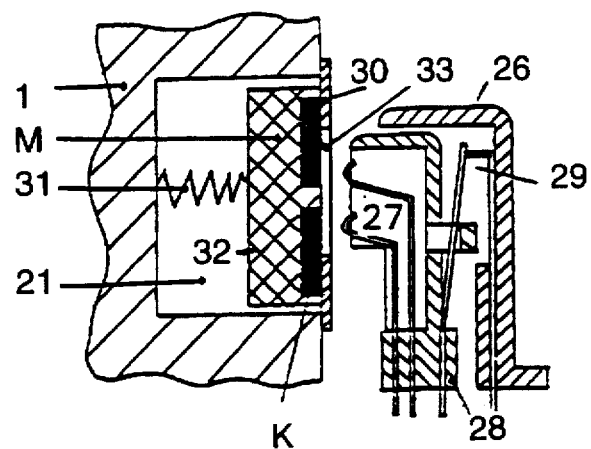
FIG. 11 shows a memory mounted with a spring bias.

In FIG. 11, a metallic frame 30 is arranged at the front end of the opening 21. The memory M together with its contacts K is pressed against the metallic frame 30 by means of the spring 31 so that all four contacts K touch the frame 30 and are short-circuited together. A damaging of the memory M due to voltages caused by static charges between the contacts K is thereby avoided. The sensing lever 26 otherwise functions as in FIG. 9. Thereby, the part 28 engages through an opening 21 in the frame 30 and finally strikes against the surface of the contacts K.

The spring force of the spring 31 is smaller than the contact pressure of the contact 29. The memory M is thereby pushed inwardly in the direction 32 so that the contacts K are released from the metallic frame 30 when the contacts K and the contact set 27 come into contact. Thereby, the displacement in the direction 32 is so small that the contact 29 is not opened and thus the recording can be allowed.

Figure 12:
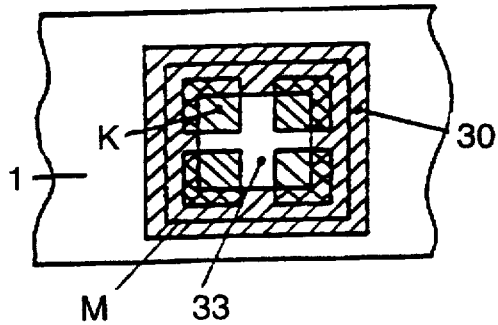
FIG. 12 is a right side view of the housing in FIG. 11.

FIG. 12 shows a view of the housing 1 in FIG. 11 from the right. The metallic frame 30 is resting on all four contacts K and short circuits the latter. However, the opening 33 in the metallic frame 30 makes it possible for the part 28 of the sensing lever 26 to enter for the purpose of making contact and displacing the memory M.

The memory M consists for example of a double sided laminated printed circuit board which forms the upper surface having the accessible contacts K on the one hand, and which is connected to the semiconductor chip arranged thereon on the other hand. A static charge can also be prevented or reduced by providing the inner walls of the opening 21 or the outer walls of the memory M with an electrically conductive layer e.g. a vapour deposited graphite layer.

Figure 13:
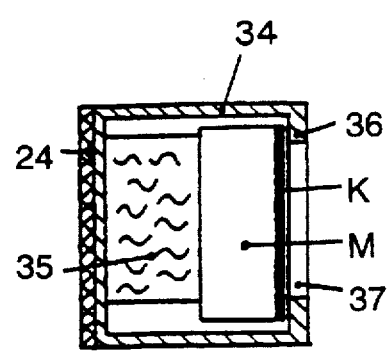
FIG. 13 shows an electrically conductive housing.

FIG. 13 shows a housing 34 consisting of an electrically conductive material e.g. a metal plate. The memory M, which is pressed together with its contacts K against a surrounding edge 36 of the housing 34 by means of a resilient foamed rubber part 35, is mounted in the housing 34. The contacts K are thereby short circuited as in FIGS. 11, 12. The recorder contains, as in FIGS. 11, 12, a sensing lever which is effective through the opening 37 in the housing 34 on the memory M, contacts its contacts K and breaks the contact between the contacts K and the edge 17 by means of a very small displacement. On the side opposite the contacts K, the housing 34 is provided with the sticky coating 24 which serves, as in FIG. 7, for releasably mounting the housing 34 in the opening 21 of the cassette housing 1. The dimensions of the housing 34 are selected such that the housing 34 can be inserted into the opening 21 of the cassette housing 1 with substantially no free play and is flush with and closes the surface of the cassette housing 1.

The memory M may consist of the actual semiconductor memory, a so-called chip, and a printed circuit board on which the semiconductor memory is arranged. It is likewise possible, in a manner similar to a chip card, to accommodate the contacts K directly on the semiconductor body.

Another development of the invention departs from the previous assumption that the cassette has to be removed from a protective sleeve for the process of reading the built-in semiconductor memory. Instead, one succeeds in being able to read the memory on the cassette through the protective sleeve. It is then no longer necessary to remove the cassette from the protective sleeve for the reading process. This is especially advantageous when, during a holiday for example, a plurality of cassettes located in protective sleeves have to be evaluated, sorted or identified by reading the memory. The removal of the cassette from the protective sleeve is then dispensed with. Moreover, one avoids having the protective sleeve lying around without the cassette or of it getting lost. A further advantage consists in that the protective function, in particular against ingress of dust and improper handling, of the protective sleeve for the cassette is not interrupted during the process of reading the semiconductor memory. The contact springs impinging on the contacts of the semiconductor memory through the protective sleeve can additionally effect a retention or arresting of the cassette with the protective sleeve in the apparatus. The spring contacts are then constructed such that they engage in holes or openings in the walls of the protective sleeve upon insertion of the protective sleeve together with the cassette contained therein and impinge on the contacts of the memory. The withdrawal of the protective sleeve from the device is then only possible by using a certain amount of force whereby the contact springs come out of the openings and release the protective sleeve. The arrangement can be effected such that a grinding process does not arise at the point of contact between the contact springs and the contacts of the memory but rather, as for a needle contact, the contact springs impinge on the contacts approximately perpendicularly. This is especially advantageous with the semiconductor chips used nowadays in which the contact surfaces bear a thin gold layer which is only some μm thick and which, by the repeated grinding processes of a contact spring, would be subjected to heavy wear and tear. The holes or openings in the protective sleeve can be so small that any ingress of dust worth mentioning is prevented. For example, the holes need only have a dimension of approximately 1×2 mm.

In accordance with one embodiment of this development, holes or an elongated opening are not provided in the walls of the protective sleeve but rather, the process of making contact is effected electrically through the wall of the protective sleeve. This can be achieved for example, by means of a known so-called Zebra connector. This is a rubber strip in which bridges consisting of conductive rubber that stretch from one side to the other are embedded at intervals. The bridges consisting of conductive rubber thus form small leads, which are isolated from each other by the rubber parts, from the one surface to the opposite surface of the connector. An advantage of a Zebra connector of this type consists in that it is flexible and automatically adjusts itself to uneven and inclined surfaces of the contact surface. By utilising a Zebra connector of this type, openings in the walls of the protective sleeve can be completely dispensed with so that their protective function is in no way prejudiced.

This development of the invention will be described hereinafter with the aid of FIGS. 14–16.

FIG. 14 shows a cassette 1 having two rotatably mounted tape spools 2, 2' therein, the magnetic tape 8 and the built-in semiconductor memory M whose four contacts K rest on the surface 4 of the cassette 1. The cassette 1 is inserted into the protective sleeve 40 consisting of synthetic material or cardboard from its open end 41. The wall 42 of the protective sleeve 40 is provided with four openings 43 in the vicinity of the contacts K. A part 44 on the apparatus which is working together with the memory M, e.g. a stand or a reading device, carries four spring contacts 45, which are associated with the holes 43 and the contacts K and should be thought of as extending perpendicularly to the plane of the diagram in the drawing.

The protective sleeve 40 together with the inserted cassette 1 is inserted into a device e.g. a stand or a reading device. Thereby, the spring contacts 45 initially slide along the surface of the wall 42 by spring action. In the final position of the cassette 1, the spring contacts 45 engage in the openings 43 by virtue of the spring effect and thus come into contact with the contacts K of the memory M. The memory M is thus contacted in this manner so that the items of information regarding the items of data, which are typical for the cassette or the recorded items and which are contained in the memory M, can be read, displayed or evaluated by a processor located in the device. At the same time, the cassette 1 is arrested in the device due to the engagement of the spring contacts 45 in the openings 43. If the cassette is extracted manually from the device, the spring contacts 45 are automatically freed from the openings 43 due to their spring action. Due to the fact that the spring contacts 45 impinge approximately perpendicularly on the contacts K, there is, in an advantageous manner, no occurrence of a grinding motion between the spring contacts 45 and the contacts K. This is advantageous because such types of contacts K of a semiconductor chip are generally provided with a thin gold layer which is only some µm thick and it can be easily destroyed by even a small grinding motion of a spring contact. The spring contacts 45 thereby form so-called needle contacts with the contacts K.

In FIG. 15, an elongated continuous opening 47, through which all four spring contacts 45 can project and come into contact with the contacts K of the memory M, is provided in the wall 42 of the protective sleeve 40 instead of the four holes 43 of FIG. 14. An opening of this type, of 15 mm length and 1–2 mm width for example, can be kept so small that an ingress of dust particles is prevented to the greatest extent.

In FIG. 16, a so-called Zebra connector is set into the wall 42 of the protective sleeve 40 in the vicinity of the memory. A connector 48 of this type consists of an intrinsically non-conductive rubber in which a plurality of bridges 49 consisting of conductive rubber is embedded. The bridges 49 respectively extend from the one surface to the opposite surface of the connector 48. The connector 48 represents a flexible deformable part which is capable of forming a plurality of contacts between the two opposite surfaces that are independent of one another. The ends of the spring contacts 45 reach the surface of the connector 48 by movement of the part 44 on the stand or the reading device in the direction 46 or by pure spring action of the spring contacts 45. Due to the flexibility of the connector 48, the latter is pressed onto the surface of the memory M which includes the contacts K. The bridges 49 consisting of conductive rubber are so dimensioned and are arranged so close together that at least one bridge 49 will always comes into contact simultaneously with a spring contact 45 and a contact K, but, on the other hand, none of the bridges will short circuit two spring contacts 45 or contacts K. In this way, there is produced a reliable degree of contact between the contacts K and the spring contacts 45. The solution has the advantage that the protective sleeve 40 remains hermetically sealed despite the degree of contact achieved. The spring contacts 45 are connected via the leads 49 to the evaluating circuit 50 of the stand or reading device. Amongst other things, the evaluating circuit 50 controls a display 51 for displaying the items of data that are typical of the cassette and the microprocessor 52 which controls mechanical or electrical functions in dependence on the items of cassette data that have been read. The functions may, for example, be the display of a wanted cassette, the presentation of the items of information contained in the memory M, a mechanical ejection of the cassette from a stand and the like. Generally, the cassette can be inserted into the protective sleeve 40 in different positions. Consequently, in order for external contacting of the contacts K to be always possible, the protective sleeve 40 is provided with the described holes 43, openings 47 or the connector 48 at every position where the memory M including the contacts K could be in dependence on the position in which it is inserted.

A further development of the invention is based upon the following consideration. The cassette initially receives a memory for the basic data which has a relatively low storage volume. Basically, this relatively cheap memory is provided in every cassette. For expanding the storage volume, the memory is not now replaced by another one but rather, an additional memory having a larger storage volume is placed in the cassette. Thereby, the contacts of the additional memory are automatically connected to the contacts of the basic memory so that both memories, namely the basic memory having a low storage volume and the additional memory having a large storage volume, are now connected together. One then ensures that both memories can be read or written over the same contacts by the selection of a bus structure for data communication with the memory. In toto, the following advantages arise from this solution. Firstly, the basic memory can contain all the simple items of data which are typical of the cassette such as e.g. those regarding the length of tape, the type of tape, the type of recording and the like. Previously used mechanical codes on the cassette housing such as holes or push-outs can thereby be saved. This basic memory only needs to have a low storage volume and is thus correspondingly cheap. Only if the occasion arises, e.g. for a very large number of recorded items, will this basic memory be extended by a second memory having a large storage volume. There is thus a large degree of freedom because memories having different storage volumes which are appropriate to the demands being made can be used as the second memory. The way is thus open for a virtually unlimited expansion up to any conceivable total available storage capacity. What is essential here, is that the basic data contained in the basic memory be retained during the expansion of the storage volume and the user then only has to pay for as much memory as he himself wants to add.

In accordance with one embodiment of this development, the second memory is constructed to be round in the form of a button cell and it contains ring-like concentric contact tracks of different cross-section on one end face. This solution has the advantage that the position at which the memory is placed in the cassette housing is arbitrary and no instructions regarding the correct installation position are required.

Preferably, the first memory is arranged on a flap located on the cassette housing below which there is a space for installing the second memory. Thereby, the contacts of the first memory lie approximately in the surface region of the cassette housing and are provided, through the flap, with corresponding contacts on the opposite side of the flap. These contacts can now be contacted by the contacts of the second memory placed in the space so that the first memory and the second memory are connected in parallel. Preferably, the flap with the first memory has a further contact which is not connected to the first memory and is contacted by a corresponding contact of the second memory. It is thereby possible for an evaluating circuit to register the presence of a second memory independently of the first memory and to thereby undertake electrical or mechanical change-overs.

In another development of the invention, the recess for inscription labels provided on VHS cassettes is utilised in an advantageous manner for accommodating the memory on the cassette housing. A plurality of advantages thereby arise. The memory, which is located in a chip-card-like card, can be subsequently added to any of the VHS cassettes which are in use or are on the market without any alterations to the cassette since every VHS cassette has the said recess. Due to the utilisation of the available recess and the sharp edges resulting from the recess, there arises a precisely defined position for the memory on the cassette so that subsequent installation by the customer or unskilled persons is easy.

In essence, the height of the card ensues from the sharp edges so that there are no edge disturbances. The installation is particularly simple for the user. He does not need to employ any particular dexterity when fixing the memory since the contacts are large in comparison with the spaces between the contacts so that an approximate placement completely suffices for the thing to function correctly. In addition, the securing of the memory to the cassette housing cannot occur in another position since a precisely defined location is predetermined by the sharp edges, the fixed, predetermined edge depressions on the side of the recording protection means and by the geometrical dimensions of the memory. The recess in the VHS cassette and/or the memory are preferably provided with means which ensure reliable and yet releasable attachment of the memory to the cassette housing. Means of this kind may be formed by a double sided adhesive tape, by a touch and close fastener or by means of an interlocking connector, a so-called snap-in. For reasons of compatibility, a recorder provided for a cassette of this type has a sensing lever at the location of the recess in the cassette housing where the memory is, just as in a conventional VHS recorder.

The contacts of the memory preferably lie in the plane of the surface of the cassette housing and are easily accessible by contact sensors in the recorder since, when the cassette sinks down, the contacts on the sensor positioned there can come into contact by means of a simple grinding action. Since the cassette is generally grasped by hand, impermissibly high voltages, which endanger the memory, can occur due to static charges on the contacts.

The card has a thickness which slightly exceeds the thickness of the memory in such a way that the memory in the card is protected at its thickest point by a film-like plate. Furthermore, the memory may be integrated into the inscription strip, this would then have the advantage that the sticking and adjustment process would only have to be carried out once. The memory forms a unit consisting of semiconductor chips and a circuit board carrying the contacts. The contacts of the memory are arranged directly on a semiconductor body. The memory has the contacts on one surface and a fixing means on the opposite surface.

This development of the invention will be explained hereinafter with the help of FIGS. 17–20.

Figure 17:
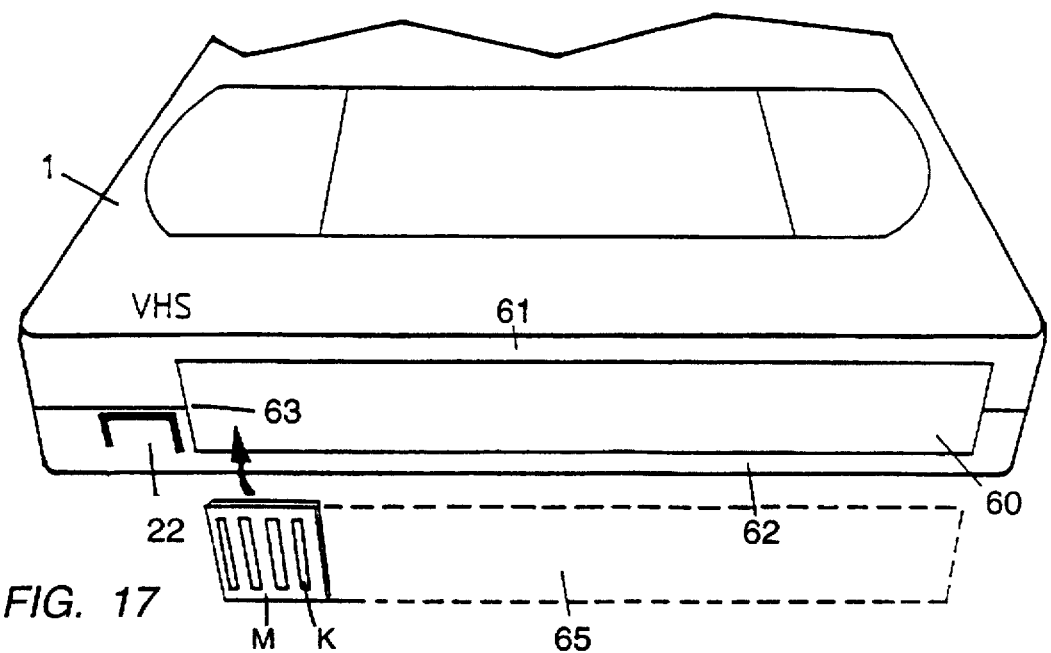
FIG. 17 shows a memory on a label adhered in a recess of a cassette.

FIG. 17 shows a part of the cassette housing 1 of a conventional VHS cassette (unrecorded cassette) including the recess 60 for the inscription label and the sharp edges 61, 62 resulting from the recess 60 as well as the edge 63 of the recess which is adjacent to the means for blocking recording 22. The memory M including the contacts K can now be placed on its sticky or adhesive side in the recess 60 in the direction shown. The possible integration of the memory into the inscription label 65 can also be perceived.

Figure 18:
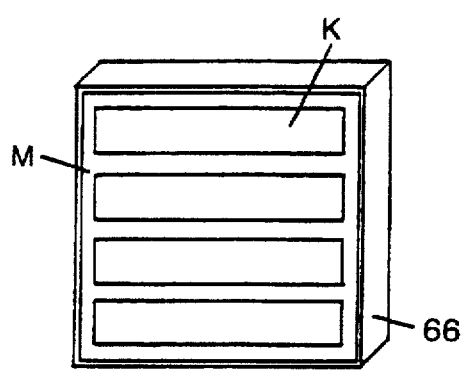
FIG. 18 shows a chip-like card with a memory and appertaining contacts.

FIG. 18 shows a chip-card-like card 64 including the memory M and the appertaining contacts K.

Figure 19:
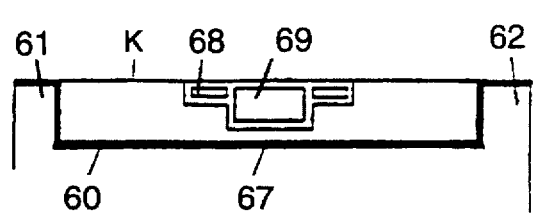
FIG. 19 shows a side view of the memory in FIG. 17.

FIG. 19 shows the side view of the memory in the recess 60 between the sharp edges 61, 62. The memory is fixed in position in the recess 60 by means of the adhesive strip 67. The terminals 68, which are in connection with the chip 69, are located below the contacts K.

Figure 20:
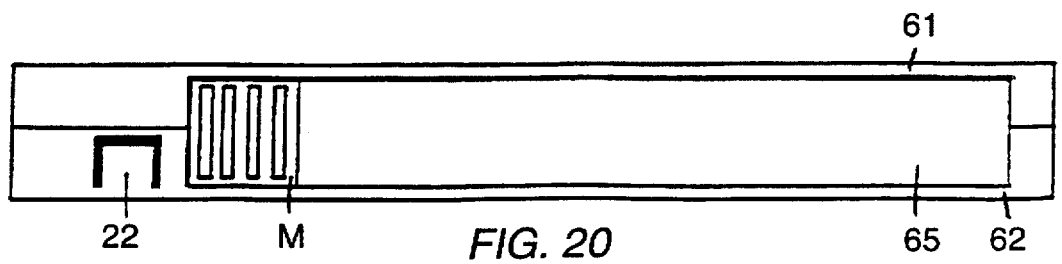
FIG. 20 shows a top view of the memory in FIG. 17.

FIG. 20 shows the top view of the video cassette having a stuck-on memory M which is located in the label 65.

In another development of the invention, an object, which is already in common use in another field and which is manufactured by the million as a mass produced article and is thus correspondingly cheap, is utilised for a new purpose. Preferably, a chip card is utilised such as is nowadays known for telephone cards, cheque cards or suchlike other cards incorporating stored credits. Thereby, a known and proven manufacturing technique can be exploited for realising the cassette including a memory. The cover also makes it possible, without any great expense, to realise the transparent viewing window for assessing the state of the tape which is usual in cassettes.

The last said development will be explained with the help of the FIGS. 21–22.

Figure 21:
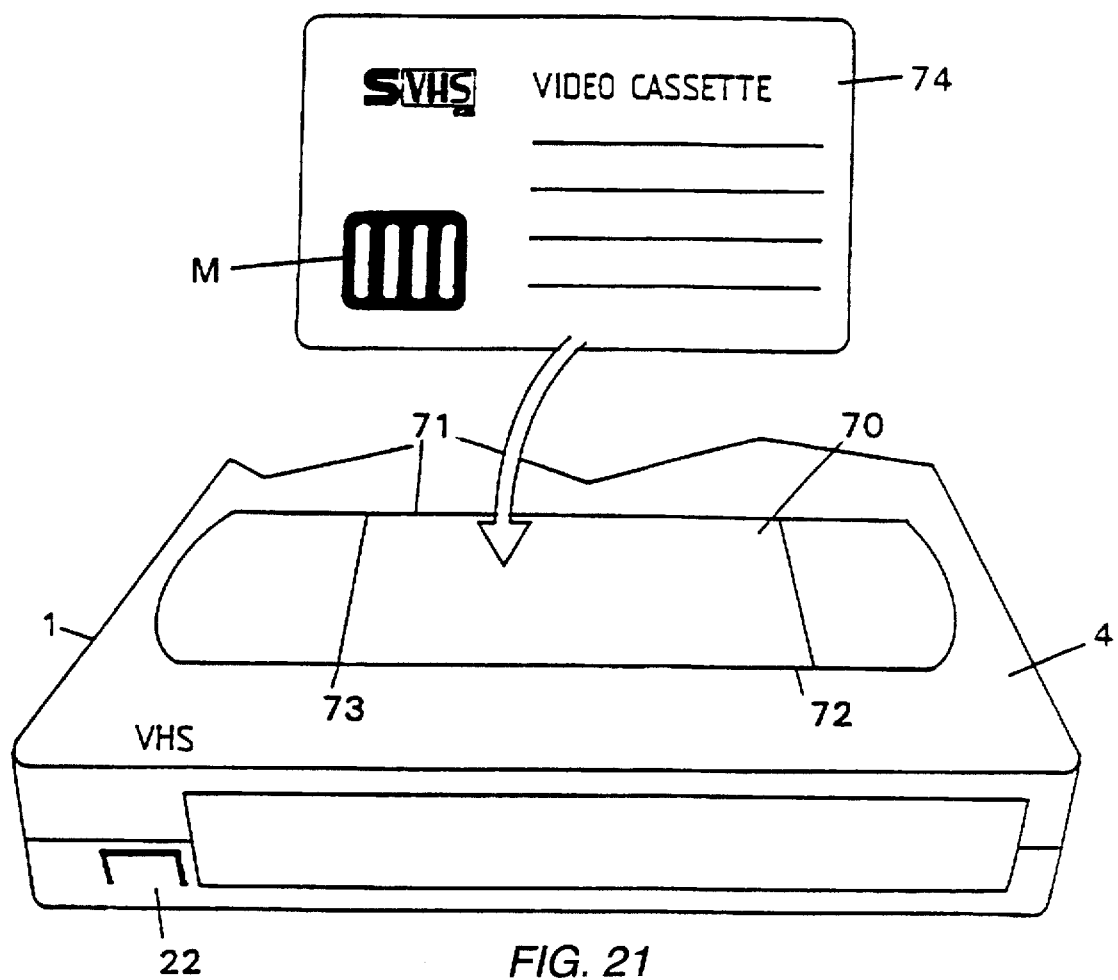
FIG. 21 shows a memory on a different label adhered to a different location on a cassette.

FIG. 21 shows a part of the cassette housing 1 of a conventional VHS cassette (unrecorded cassette) including the recess 70 for the inscription label and the sharp edges 71, 72 resulting from the recess 70 as well as the corner 73 of the recess which is adjacent to the means for blocking recording 22. The memory M including the contacts K can now be placed on its sticky or adhesive side in the recess 70 in the direction shown. The possible integration of the memory into the inscription label 74 can also be perceived.

Figure 22:
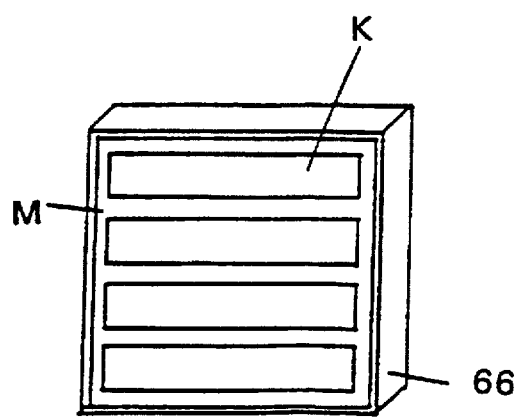
FIG. 22 shows a chip-like card with a memory and appertaining contacts.

FIG. 22 shows a chip-card-like card 66 including the memory M and the appertaining contacts K.

We claim:

1. A cassette for use with a recording apparatus, comprising:
 a housing for a recording medium, said housing having upper and lower surfaces and side walls, said recording medium being accessible through one of said side walls;

said housing of said cassette having a recess which is otherwise provided for receiving a sensing lever which prevents recording when said cassette is inserted in said recording apparatus and said sensing member projects into said recess;

at least a portion of a chip card disposed in said recess in said housing of said cassette, said chip card part having a memory formed integrally therewith and externally accessible contacts; and, said contacts of said portion of said chip card being positioned to be engageable by corresponding contacts in said recording apparatus when said cassette is inserted therein.

2. A cassette in accordance with claim 1, further comprising resilient means disposed between an inwardly facing surface of said portion of said chip card and an outwardly facing surface of said recess.

3. A cassette in accordance with claim 1, wherein said cassette conforms to a VHS cassette standard.

4. A cassette in accordance with claim 1, wherein said cassette conforms to a digital recording cassette standard.

5. A recording apparatus, comprising:

a mechanism for receiving a cassette having a housing for a recording medium, said housing having upper and lower surfaces and side walls, said recording medium being accessible through one of said side walls;

said housing of said cassette having a recess which is otherwise provided for receiving a sensing lever which prevents recording when said cassette is inserted in said recording apparatus and said sensing member projects into said recess;

at least a portion of a chip card disposed in said recess in said housing of said cassette, said chip card part having a memory formed integrally therewith and externally accessible contacts; and, said recording apparatus having corresponding contacts for engaging with said contacts of said portion of said chip card when said cassette is inserted therein.

* * * * *